Feb. 10, 1953 — L. F. GADBOIS — 2,628,089
SHOCK ABSORBER FOR RAILWAY CAR TRUCKS
Filed Nov. 5, 1949
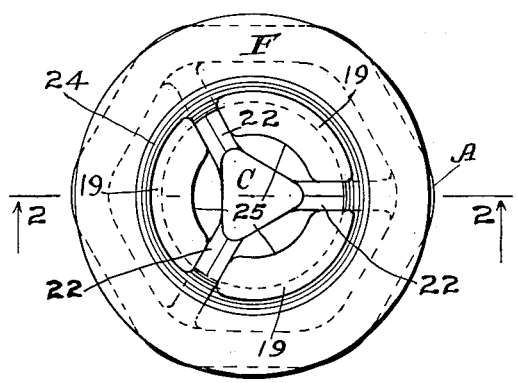
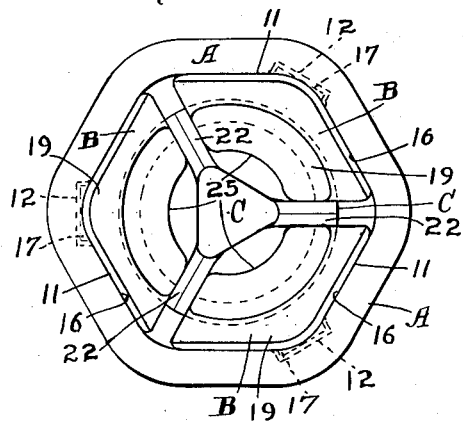
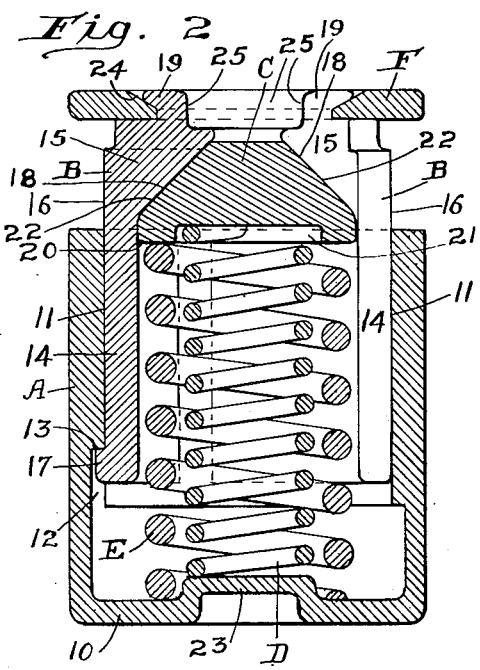
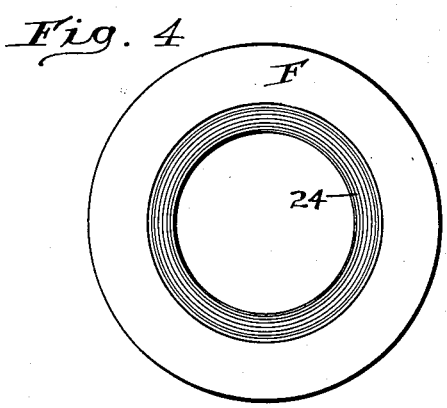
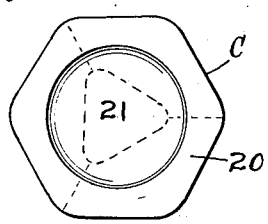
Inventor:
Lewis F. Gadbois.
BY Henry Fuchs
Atty.

Patented Feb. 10, 1953

2,628,089

UNITED STATES PATENT OFFICE 2,628,089

SHOCK ABSORBER FOR RAILWAY CAR TRUCKS

Lewis F. Gadbois, Kenmore, N. Y., assignor to W. H. Miner, Inc., Chicago, Ill., a corporation of Delaware Application November 5, 1949, Serial No. 125,682

5 Claims. (Cl. 267—9)

1

This invention relates to improvements in friction shock absorbers for snubbing or dampening the action of railway car truck springs.

One object of the invention is to provide a friction shock absorber of the character indicated, comprising a friction casing, elongated friction shoes slidingly telescoped within the casing, wedge means cooperating with the outer end portions of the shoes for spreading the shoes apart, retaining lugs on the shoes engaging stop shoulders on the casing, and spring means reacting between the casing and the wedge means for forcing the wedge means into wedging engagement with the shoes, and opposing movement of the wedge means and shoes inwardly of the casing, wherein means, in the form of a ring embracing the shoes at points outwardly of the wedging engagement thereof by the wedge means, is provided, acting as fulcrum means on which the shoes are rockable, thus effectively holding the shoes spread apart at their inner ends with the retaining lugs of the shoes engaged with the stop shoulders of the casing, and preventing lateral inward tilting of the shoes at said inner end portions, which might otherwise occur and result in failure of the mechanism to operate properly.

Other objects of the invention will more clearly appear from the description and claims hereinafter following.

In the accompanying drawing forming a part of this specification, Figure 1 is a top plan view of my improved friction shock absorber. Figure 2 is a transverse, vertical sectional view, corresponding substantially to the line 2—2 of Figure 1. Figure 3 is a view similar to Figure 1, with the retaining ring for the outer ends of the shoes omitted. Figure 4 is a top plan view of the retaining ring of my improved mechanism. Figure 5 is a bottom plan view of the wedge block of said mechanism.

As illustrated in the drawing, my improved shock absorber comprises broadly a friction casing A, three friction shoes B—B—B, a wedge block C, springs D and E, and a retaining ring F.

The casing A is in the form of a tubular member of hexagonal, transverse cross section, open at its upper end and closed at its bottom end by a transverse wall 10. The interior of the casing presents three lengthwise extending friction surfaces 11—11—11 of V-shaped, transverse cross section, each V-shaped surface 11 being formed by two adjacent walls of the hexagonal casing. At alternate corners, the interior vertical walls of the casing are slotted in vertical direction at their lower ends, as indicated at 12—12—12. The transverse end walls at the upper ends of the slots 12—12—12 provide stop shoulders 13—13—13 for a purpose hereinafter pointed out.

The friction shoes B are three in number and are arranged symmetrically about the vertical central axis of the casing in sliding telescoped relation to the latter. Each shoe B comprises an elongated, platelike section 14 of V-shaped, transverse cross section, and an inwardly enlarged head 15 at the top end of the plate section 14. The plate section 14 presents a lengthwise extending friction surface 16 on its outer side, of V-shaped, transverse cross section, engaged with one of the V-shaped friction surfaces of the casing. At the lower end of the plate section 14 of each shoe B is provided a laterally outwardly projecting retaining lug 17, which is located at the corner presented by the V-shaped surface of said section, and is engaged in the corresponding slot 12 of the casing in back of the shoulder 13. As will be evident, engagement of the retaining lug 17 of each shoe with the corresponding stop shoulder 13 of the casing positively limits outward movement of said shoe. The laterally inward projecting head 15 of each shoe presents a flat wedge face 18 on its underneath side. The wedge faces 18—18—18 of the three shoes diverge inwardly or downwardly, as clearly illustrated in Figure 2. Each shoe B has an undercut, upstanding retaining lug 19 of arc-shaped form at its top end, with which the retaining ring F is adapted to be engaged, the three arc-shaped lugs 19—19—19 forming parts of a complete circle and interfitting with the ring F. The heads 15—15—15 of the shoes B—B—B are recessed on their inner sides, as indicated at 25—25—25, to provide an opening adapted to accommodate the usual spring centering lug of the top spring plate of a cluster of truck springs.

The wedge block C has a flat, transverse, bottom end face 20 provided with a central seat or recess 21 for the upper end of the spring D. At its top side, the block C has three upwardly converging wedge faces 22—22—22, engaging, respectively, the wedge faces 18—18—18 of the shoes B—B—B.

The springs D and E are both in the form of helical coils, arranged within the casing A. The springs D and E react between the bottom wall 10 of the casing and the wedge block C. The spring E surrounds the spring D and is heavier than the latter. The spring D bears at its lower end on an upstanding hollow boss 23 on the bottom wall 10 of the casing, and has its upper end seated in the recess 21 of the wedge block C. The spring E bears at its bottom end on the wall 10 of the casing A and at its top end on the bottom face 20 of the wedge block C. In this connection it is pointed out that the hollow boss 23 at the bottom end of the casing A provides a seat to accommodate the usual spring centering lug of the bottom spring plate of a cluster of truck springs of a railway car truck.

The retaining ring F is in the form of a heavy washer, having its inner edge beveled, as indicated at 24. The ring F surrounds the lugs 19—19—19 at the top ends of the shoes, with its beveled edge 24 engaged beneath the overhanging portions of the undercuts of said lugs. The ring F forms a fulcrum for the upper ends of the shoes B—B—B, on which the latter pivot as the wedge C spreads the same apart, thus effecting spreading of the shoes at their lower ends to hold said lower ends in contact with the friction surfaces of the casing and also hold the retaining lugs 17—17—17 of the shoes engaged with the stop shoulders 13—13—13 of the casing. As shown in Figure 2, the ring F corresponds in outer diameter to the exterior diameter of the casing A, and projects beyond the outer sides of the shoes and, in effect, forms a follower which is engageable with the upper end of the casing to limit compression of the mechanism.

In assembling my improved shock absorber, the springs D and E, together with the wedge block C, are first placed in the casing A, the wedge block being seated on top of the springs. The wedge block C is then forced inwardly until the springs are compressed substantially solid, and is held in that position. The shoes B—B—B are then inserted around the wedge block C and forced inwardly to a point where the lugs 17—17—17 are disposed at levels below the shoulders 13—13—13 of the casing. Next, the ring F is engaged with the lugs 19—19—19, the beveled inner edge 24 of the ring being seated in the recesses provided by the undercut portions of said lugs. The pressure is then removed from the wedge block C, permitting the springs to expand and project the wedge outwardly into wedging engagement with the shoes to spread the latter apart and rock the same on the ring F to spread the lower ends of the shoes and engage the lugs 16—17—17 in back of the shoulders 13—13—13 of the casing.

The operation of my improved shock absorber is as follows: Upon the shoes B—B—B being forced inwardly of the casing A, they are wedged apart by the spring resisted wedge block C, thereby providing high frictional resistance to absorb the shocks and dampen the action of the truck springs of a railway car. During this spreading action by the wedge block C, fulcruming of the shoes at their upper ends on the ring F causes the lower ends of the shoes to tightly engage the friction surfaces of the casing and at the same time prevent inward tilting of said lower ends.

I claim:

1. In a friction shock absorber, the combination with a casing; of a plurality of friction shoes slidingly telescoped within the casing, said shoes projecting outwardly beyond the casing; a wedge in wedging engagement with the shoes near their outer ends, said shoes extending outwardly beyond the wedge in direction lengthwise of the mechanism; spring means within the casing bearing on said wedge and reacting between the latter and said casing to yieldingly oppose movement of said wedge inwardly of the casing; and a ring surrounding said portions of said shoes which extend outwardly beyond said wedge, said shoes having rocking engagement with said ring.

2. In a friction shock absorber, the combination with a casing open at one end and closed at the other end by a transverse wall, said casing having interior friction surfaces at said open end; of a plurality of elongated friction shoes in sliding engagement with said friction surfaces, said shoes projecting outwardly beyond the casing and having inwardly facing wedge faces spaced inwardly from their outer ends; a ring surrounding said shoes outwardly of said wedge faces, said shoes having rocking engagement with said ring; a wedge in wedging engagement with the wedge faces of said shoes; and spring means within the casing bearing at opposite ends on said wedge and the transverse wall of the casing.

3. In a friction shock absorber, the combination with a casing open at one end and closed at the other end by a transverse wall, said casing having interior friction surfaces at said open end; of a plurality of elongated shoes in sliding frictional engagement with the interior of the casing, said shoes having lugs at the outer ends thereof, said lugs being undercut; a ring surrounding the outer ends of said shoes, said ring being engaged within the undercut portions of said lugs; inwardly facing wedge faces on said shoes inwardly of said lugs; a wedge in wedging engagement with the wedge faces of said shoes; and spring means reacting between said transverse wall of the casing and said wedge.

4. In a friction shock absorber, the combination with a casing; of a plurality of friction shoes slidingly telescoped within the casing, said shoes projecting outwardly beyond the casing, said casing and shoes having cooperating shoulders for limiting outward movement of the shoes; a wedge spaced inwardly from the outer ends of said shoes in wedging engagement with said shoes, near their outer ends; spring means bearing on said wedge and reacting between said casing and wedge to yieldingly oppose movement of said wedge inwardly of the casing; and a ring surrounding the outer end portions of said shoes in embracing relation outwardly of said wedge in direction lengthwise of the mechanism, said shoes having rocking engagement with said ring.

5. In a friction shock absorber, the combination with a casing open at the top end and closed at the bottom end by a transverse wall, said casing having interior friction surfaces at said open end and stop shoulders at the lower ends of said friction surfaces; of a plurality of elongated friction shoes in sliding engagement with said friction surfaces, said shoes projecting upwardly beyond the upper end of the casing and having retaining lugs at the lower ends thereof engageable with said stop shoulders of the casing, said shoes having downwardly facing wedge faces near their upper ends spaced below said upper ends thereof; a ring surrounding said shoes in closely embracing relation at a point upwardly beyond said wedge faces, said shoes having rocking engagement with said ring; a wedge in wedging engagement with the wedge faces of said shoes; and spring means within the casing bearing on the bottom end of said wedge and reacting between the latter and the transverse wall of the casing.

LEWIS F. GADBOIS.

REFERENCES CITED

The following references are of record in the file of this patent:

UNITED STATES PATENTS

| Number | Name | Date |
|---|---|---|
| 1,979,846 | Sproul | Nov. 6, 1934 |
| 2,220,074 | Blattner | Nov. 5, 1940 |
| 2,352,030 | Sproul | June 20, 1944 |
| 2,366,918 | Light | Jan. 9, 1945 |
| 2,382,563 | Haseltine | Aug. 14, 1945 |
| 2,552,145 | Blattner | May 8, 1951 |

FOREIGN PATENTS

| Number | Country | Date |
|---|---|---|
| 4,120 of 1913 | Great Britain | Feb. 18, 1914 |